(12) United States Patent
Swindle

(10) Patent No.: US 8,944,412 B2
(45) Date of Patent: Feb. 3, 2015

(54) CABLE ROUTING APPARATUS

(71) Applicant: Jacob Tyler Swindle, Prattville, AL (US)

(72) Inventor: Jacob Tyler Swindle, Prattville, AL (US)

( * ) Notice: Subject to any disclaimer, the term of this patent is extended or adjusted under 35 U.S.C. 154(b) by 205 days.

(21) Appl. No.: 13/726,164

(22) Filed: Dec. 23, 2012

(65) Prior Publication Data

US 2014/0175349 A1    Jun. 26, 2014

(51) Int. Cl.
*H02G 1/08* (2006.01)
*H02G 9/04* (2006.01)
*H02G 1/06* (2006.01)
*H02G 3/04* (2006.01)

(52) U.S. Cl.
CPC . *H02G 9/04* (2013.01); *H02G 1/06* (2013.01); *H02G 3/0437* (2013.01); *H02G 1/088* (2013.01)

USPC ............... 254/134.3 R; 254/134.3 FT

(58) Field of Classification Search
USPC ....... 254/134.3 R, 134.3 FT, 134.3–134.3 SC
See application file for complete search history.

(56) References Cited

U.S. PATENT DOCUMENTS

| 4,635,875 A * | 1/1987 | Apple ................... 242/155 BW |
| 2009/0065753 A1* | 3/2009 | Gonen et al. ................ 254/93 R |
| 2013/0026429 A1* | 1/2013 | Jordan et al. ........... 254/134.3 R |

\* cited by examiner

*Primary Examiner* — Lee D Wilson

(57) ABSTRACT

This invention is a machine designed to route the preliminary rope or small gauge cables in cable tray while creating a safer and easier work environment. The machine will be placed on top of the cable tray and be used to route desired cables. It will utilize a wireless remote switch that will be controlled by an operator from a safe location; it will use two motors to move the machine which be attached to four hinged wheels with an inner shaft and wheel shaft. The wheels will be set on top of the flanges of the cable tray and will guide themselves along the desired path.

19 Claims, 4 Drawing Sheets

CABLE ROUTING APPARATUS

BACKGROUND

The current method of routing cables is a person placing and pulling the cables by hand. This practice creates fall hazards and bodily injuries due to the working environment. Cable trays are typically placed at high elevations which introduce fall hazards and limited working space. Per OSHA standards, a person is not allowed to use cable tray as a walkway or platform. Workers are usually forced to break this rule or stand on unsupported objects such as conduits or pipes. By doing this, workers are continually putting themselves in dangerous situations. Cable trays are typically spaced 1'-6" apart which causes the workers to be continually bent over or crawling in the cable tray. This invention will allow them to route cables far from the dangers they currently encounter. This invention will move the work area from high elevations to ground level and will alleviate the physical strain of pulling cables in constrained areas.

SUMMARY OF THE INVENTION

The invention will be used in industrial environments where cable tray is used to support cables such as power, instrumentation, and communication. It will allow workers to safely and easily route cables along the desired path. The machine will be placed on the cable tray and cables will be attached to the rear of the machine using attachment hooks. A power cord will be plugged into the machine that will power two motors. The motors will turn the right angle gear system which will then turn the inner shafts. The inner shafts will be connected to the wheel shafts using set screws which will cause the wheels to turn. The wheels will guide themselves along the flanges of the cable tray. The operator will control the machine using a wireless remote that gives power through a switch to the motors. This machine will greatly reduce work related injuries by allowing the machine to do the manual required to pull cables in cable tray.

DETAILED DESCRIPTION OF THE INVENTION

Figure 1:
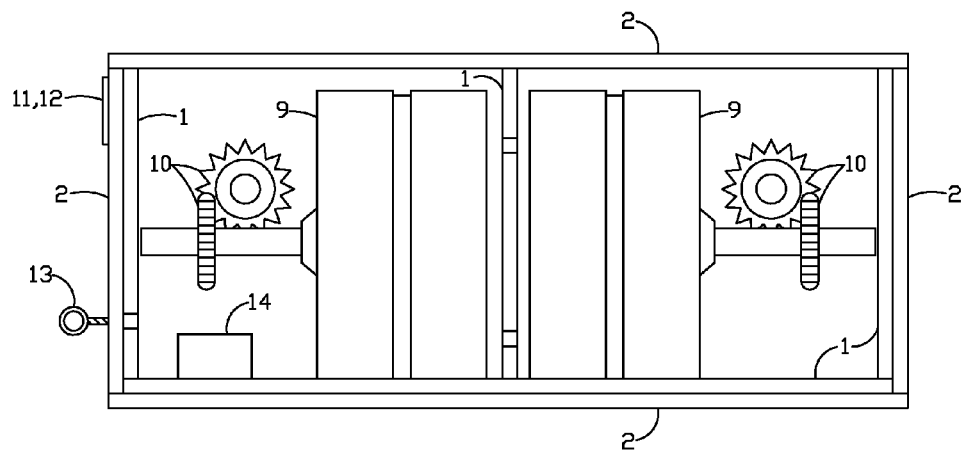
FIG. 1—A side view of the machine showing the interior components and mechanics.
Figure 2:
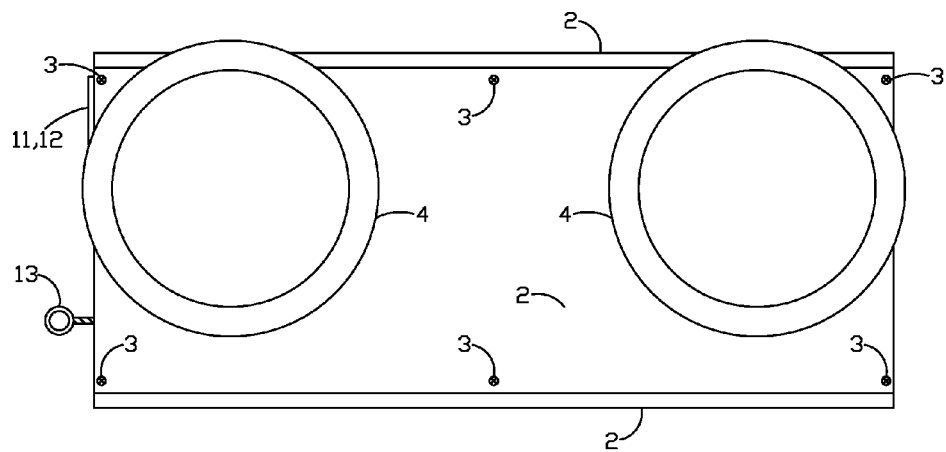
FIG. 2—A side view of the machine showing the exterior components.
Figure 3:
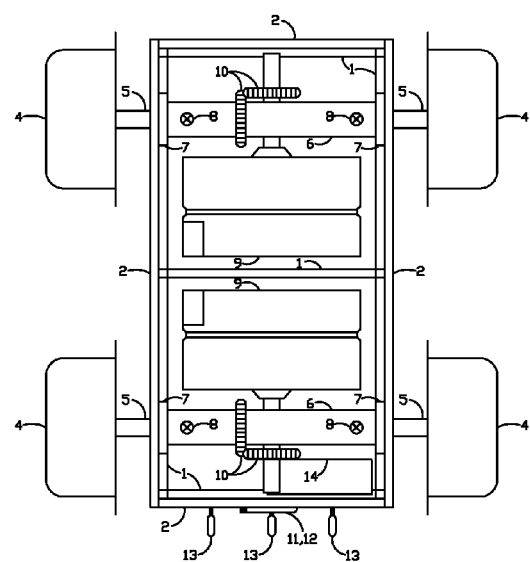
FIG. 3—A plan view of the machine showing the interior components and mechanics.
Figure 4:
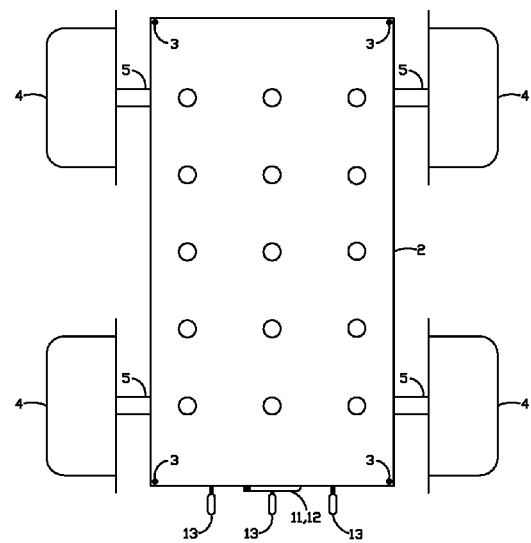
FIG. 4—A plan view of the machine showing the exterior components.
Figure 5:
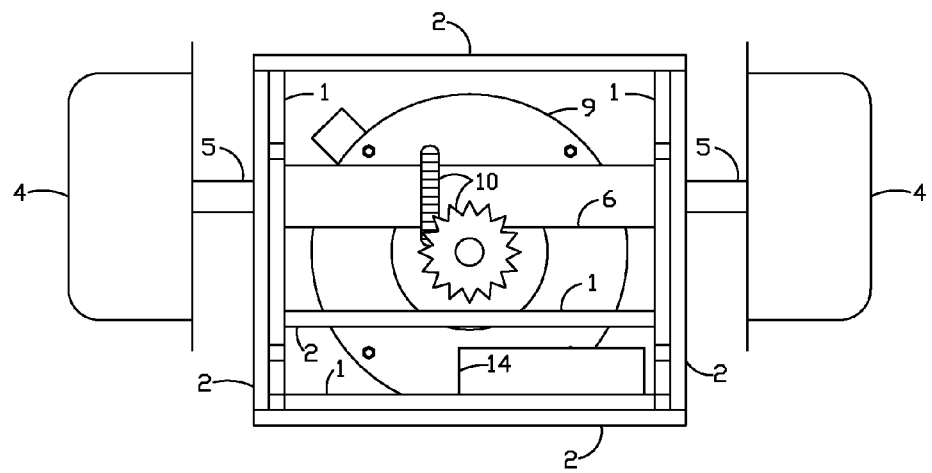
FIG. 5—A rear view of the machine showing the interior components and mechanics.
Figure 6:
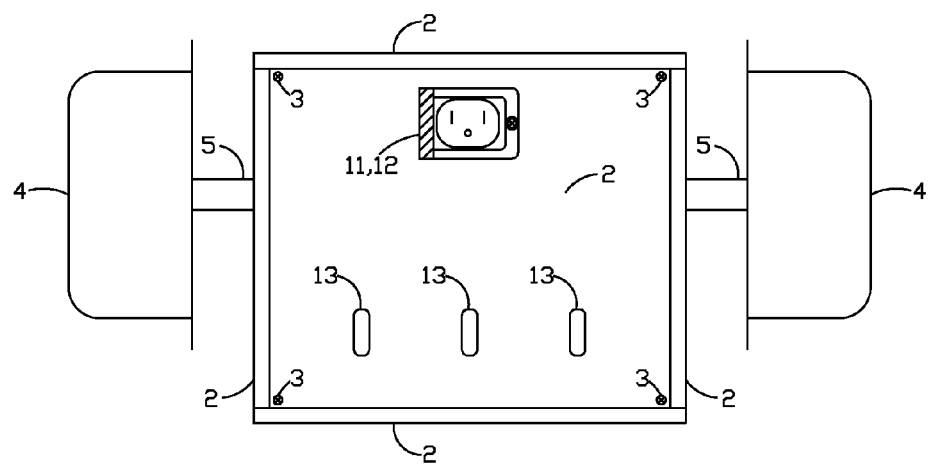
FIG. 6—A rear view of the machine showing the exterior components.
Figure 7:
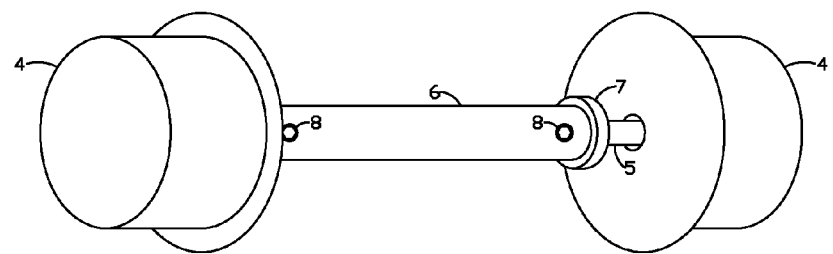
FIG. 7—A perspective view of the drive system.
Figure 8:
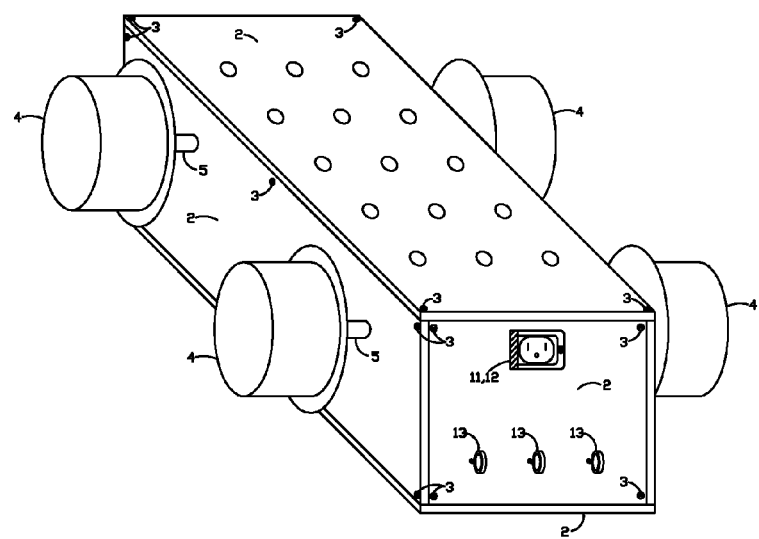
FIG. 8—A perspective view of the machine.

For the design of the frame, ¼" aluminum square tubing 1 will be used to give the device the structural stability it needs. A total of thirteen pieces of different length tubing will be welded together at all intersections. The horizontal left and right side members will be 13" long and the horizontal front and rear members will be 6" long. The horizontal center members will be 6" long as well. The horizontal center members will be used to mount the motors using threaded rods ran through both motors. The vertical members will be 5¼" long and will be used to attach the shell.

The shell 2 of the cable routing machine will be made out of specified length and width of PVC sheets. This material is chosen to limit the risk of conductivity with cables in the cable tray. All pieces will be attached to the frame with PVC screws 3. The left and right side pieces will be 5½" wide by 13½" long. The top and bottom pieces will be 7" wide by 13½" long. The front and rear pieces will be 6½" wide by 5½" long. The top piece will have ½" precut holes in the top of the shell at specified locations to act as ventilation for the motor and locations to tighten set screws 8 in the inner shaft 6. The left and right piece will have ⅝" holes cut in line with the inner shafts 6 to allow the wheel shafts 5 to enter the machine. The rear piece will have three attachment hooks 13, the female power connection 11, and the latch 12 mounted it. The three attachment hooks 13 will be used to connect the rope or cable to the machine at the beginning of the cable pull. The female power connection 11 will be used to plug in a three prong power cable while the latch 12 will close and lock after the power cord is attached to ensure the cord does not pull loose.

The drive system will be versatile so that the cable routing machine can be used on any cable tray with a width of 12" or more. The wheels 4 will be 2" wide and will have a 4" outer diameter with a ½" lip or flange on the inside of the wheel. They will be hinged to give them the ability to be turn +/−10° off center and will come preassembled with solid steel wheel shafts 5 that will be 4" long and will have a ½" outside diameter. The wheel shaft 5 will pass through the shell 2 and be inserted into the inner shaft 6. The inner shaft 6 will be made of aluminum and will have a ½" inner diameter and 1" outer diameter. The wheel shafts 5 will be locked into the inner shaft 6 with set screws 8 which are accessible through the top of shell 2. The inner shaft 6 will be set in the shaft hub 7 allowing it spin freely and also supporting it. The shaft hub 7 will be made of aluminum with a 1 1/16" inner diameter and 1½" outer diameter. They will be attached to the inside of the shell 2 in line with the precut holes in the side of the shell 2.

The pulling force of the cable routing machine will be two motors 9. Each motor 9 will be rated for 120 VAC, 60 Hz, 0.5 HP in a 42 size frame. They will be mounted on the center horizontal pieces of the frame 1. The right angle gear system 10 will have a 1:1 ratio and will link the shaft of the motor 9 to the inner shaft 6. The motor 9 will engage the right angle gear system 10 which will turn the inner shaft 6 which will then cause the wheels 4 to turn. The front two wheels 4 will be driven independently of the rear two wheels 4 which give the machine four-wheel drive capabilities. This will allow the machine to overcome any obstacles on the cable tray such as bolts or small gaps.

The power system of the cable routing machine will consist of a standard power cord, female power connection 11, and wireless switch 14. A standard power cord will be plugged into a receptacle near the starting point of the cable route and then into the female connection 11 on the back of the machine. A latch 12 will be used to ensure the power cable does not come loose from the machine. Electrical connections will be made from the female power connection 11 to the two motors 9 using motor provided wires. A wireless switch 14 will be mounted on the inside of the machine that the operator will control using the wireless remote. Once a signal is given to the switch 14 to apply power, the motors 9 will begin to turn. The range of the remote would be approximately 100 feet. With the design, the operator the machine can stand at least 100 feet away from the cable tray and control the machine. This takes away the danger of fall hazards and physical injury.

The invention claimed is:

1. A cable routing device for routing cables in a cable tray said cable routing device comprising: a frame including an interior space;
   a drive system located within said interior space having at least one motor and at least one gear system located on a crankshaft; a wireless switch; at least one cable attachment mechanism; and a wheel assembly having a linearly adjustable length varying a distance between at least one pair of wheels.

2. The cable routing device according to claim 1 wherein said wheel assembly further comprising an outer flange having an outer diameter with an inner cylindrical portion with a diameter projecting from said flange and said inner cylindrical diameter being less than said flange diameter.

3. The cable routing device according to claim 1 wherein said at least one cable attachment mechanism further comprising a plurality of attachment mechanism which are hooks attached to said frame.

4. The cable routing device according to claim 1 wherein said frame includes a latch which is a locking mechanism for securing a power supply line from said drive system.

5. The cable routing device according to claim 2 wherein said wheels assembly further include an outer shaft having an inner shaft and a set screw for linear adjustment of said inner shaft, wherein said set screw locks said outer shaft and inner shaft with respect to one another.

6. The cable routing device according to claim 1 wherein said wireless switch being located within said interior of said frame.

7. The cable routing device according to claim 1, further comprising a body having an outer shell being a non-metallic material which encloses said frame.

8. The cable routing device according to claim 1 wherein said drive system has a plurality of motors.

9. The cable routing device according to claim 1 wherein the at least one gear is a right angle gear system.

10. The cable routing device according to claim 7 wherein said shell is constructed from a plurality of PVC sheets attached to one another forming rectangular shaped exterior walls for the device.

11. The cable routing device according to claim 1 wherein said frame is constructed from a plurality of aluminum square tubing welded together forming structural support for the device.

12. The cable routing device according to claim 2 wherein said wheel assembly further comprise a plurality of pairs of wheels constructed of a non-metallic material.

13. The cable routing device according to claim 5 wherein said inner shaft is constructed from steel and coupled to said wheel assembly.

14. The cable routing device according to claim 5 wherein said wheel assembly further comprises a shaft hub for allowing said outer shaft to spin freely.

15. The cable routing device according to claim 5 wherein said outer shaft is constructed from aluminum having a cylindrical hollow interior and two drilled holes.

16. The cable routing device according to claim 9 wherein said right angle gear system is constructed from steel in a spiral pattern.

17. The cable routing device according to claim 1 wherein said wheel assembly further comprises at least one set screw placed in an inner shaft for locking an outer shaft in to said inner shaft.

18. The cable routing device according to claim 1 wherein said drive system comprises a plurality of motors.

19. The cable routing device according to claim 1 wherein said switch further comprises a remote for performing wireless capabilities.

* * * * *